United States Patent [19]
Janis et al.

[11] Patent Number: 5,142,663
[45] Date of Patent: Aug. 25, 1992

[54] METHOD FOR MEMORY MANAGEMENT WITHIN A DOCUMENT HISTORY LOG IN A DATA PROCESSING SYSTEM

[75] Inventors: Frederick L. Janis, Keller; Marvin L. Williams, Lewisville; Diana S. Wang, Trophy Club, all of Tex.

[73] Assignee: International Business Machines Corporation, Armonk, N.Y.

[21] Appl. No.: 484,701

[22] Filed: Feb. 23, 1990

[51] Int. Cl.$^5$ .............................................. G06F 11/00
[52] U.S. Cl. .................... 395/575; 364/DIG. 2; 364/962.1; 364/965.8; 364/DIG. 1; 364/246.12; 364/246.13; 371/16.5; 371/29.1
[58] Field of Search ................. 371/16.5, 29.1; 364/281.1, 962.1, 962.4, 246.12, 246.13, 965.8

[56] References Cited
U.S. PATENT DOCUMENTS

| | | | |
|---|---|---|---|
| 3,704,363 | 11/1972 | Salmassey et al. | 371/29.1 |
| 4,349,875 | 9/1982 | Tada | 364/200 |
| 4,437,155 | 3/1984 | Sawyer et al. | 364/200 |
| 4,823,310 | 4/1989 | Grand | 364/900 |

Primary Examiner—Charles E. Atkinson
Attorney, Agent, or Firm—Andrew J. Dillon

[57] ABSTRACT

A method for memory management within a document history log in a data processing system having multiple resource objects which are accessible by a plurality of users within the data processing system. A history log is created and associated with each resource object for which documentation of selected activities is desired. Next, a maximum memory size for each document history log is specified along with a protocol which dictates the order in which that memory shall be allocated after the maximum memory size has been exceeded. Thereafter, documentation of each activity which relates to a selected resource object is stored within its associated document history log after determining whether or not sufficient memory space is available. In the event sufficient memory space does not exist within the document history log, new activities are overwritten in accordance with the specified protocol. In the event such overwriting has not been specified, an appropriate error message is generated. In this manner it is possible to ensure that activities relating to a particular resource object are recorded within a document history log after exceeding the maximum memory space of that document history log.

10 Claims, 3 Drawing Sheets ized to reconstruct the database in the event of an abnormal termination of the system. As above, such logs record all counts within the system based upon a filter set for the entire system by the database administrator.

Finally, certain network communications subsystems, such as VTAM, or Virtual Telecommunication Access Method utilize a history log system to log all network commands and responses These logs are utilized for problem solving and are generally written to tape or disk storage.

In view of the above, it should be apparent that a need exists for a method of memory management within a document history log so that activities may continue to be recorded after exceeding document history log memory space.

SUMMARY OF THE INVENTION

It is therefore one object of the present invention to provide an improved data processing system.

It is another object of the present invention to provide an improved method of maintaining multiple resource objects within a data processing system.

It is yet another object of the present invention to provide a method for memory management within a document history log wherein a user may specify the manner in which memory space within the document history log shall be allocated.

The foregoing objects are achieved as is now described. The method of the present invention may be utilized to provide memory management within a document history log in a data processing system having multiple resource objects which are accessible by a plurality of users within the data processing system. A history log is created and associated with each resource object for which documentation of selected activities is desired. Next, a maximum memory size for each document history log is specified along with a protocol which dictates the order in which that memory shall be allocated after the maximum memory size has been exceeded Thereafter, documentation of each activity which relates to a selected resource object is stored within that resource object's associated document history log after determining whether or not sufficient memory space is available. In the event sufficient memory space does not exist within the document history log, new activities are overwritten in accordance with the specified protocol. In the event such overwriting has not been specified, an appropriate error message is generated. In this manner it is possible to ensure that activities relating to a particular resource object are recorded after exceeding document history log memory space.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

METHOD FOR MEMORY MANAGEMENT WITHIN A DOCUMENT HISTORY LOG IN A DATA PROCESSING SYSTEM

CROSS-REFERENCE TO RELATED APPLICATIONS

Figure 1:
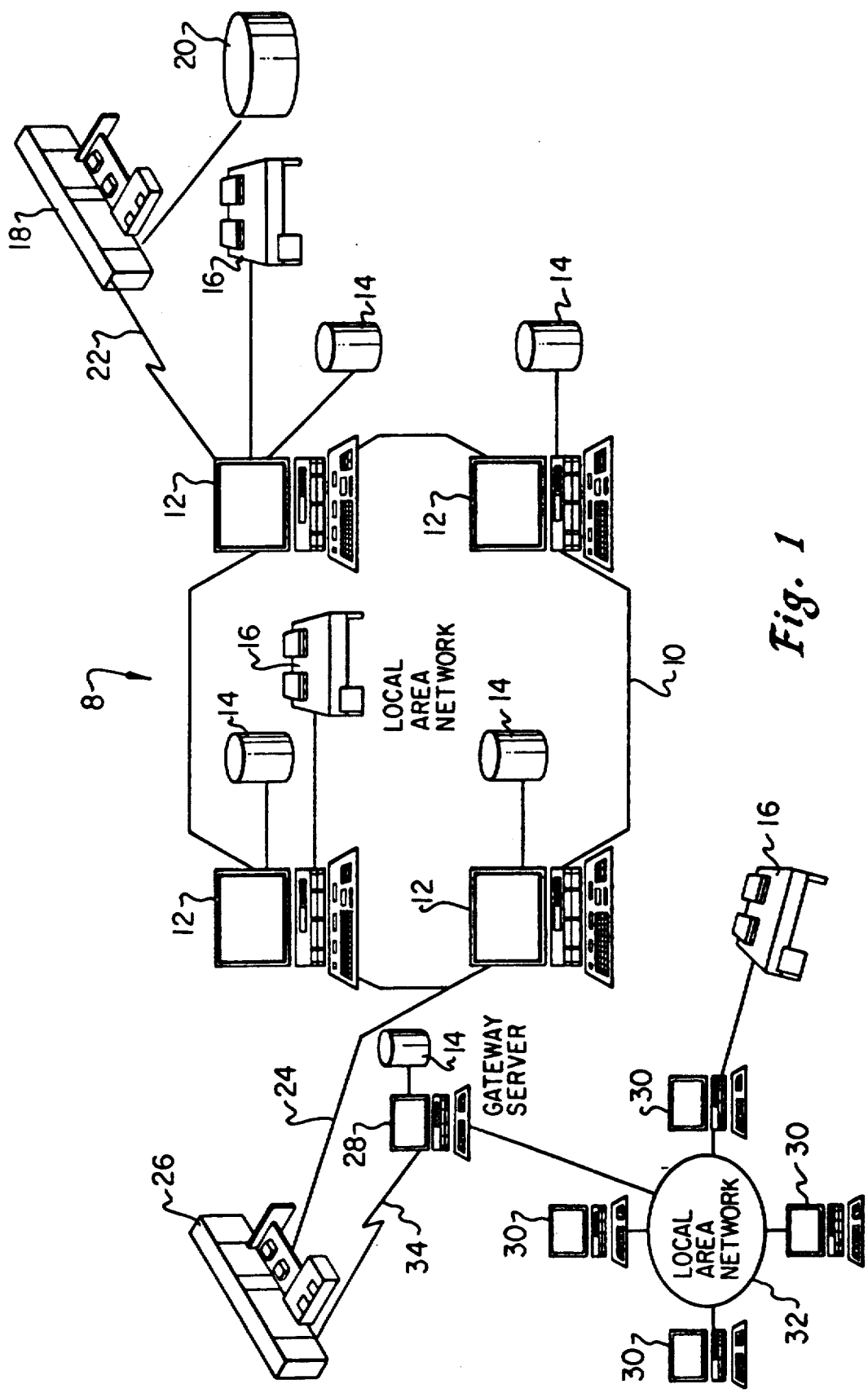

The present application is related to the following United States patent applications, each by the inventors hereof, filed of even date herewith and assigned to the assignee herein:

U.S. Pat. application Ser. No. 07/484,706, entitled "Method For Maintaining A Selective Document History Log In A Data Processing System" now U.S. Pat. No. 5,119,493;

U.S. Pat. application Ser. No. 07/484,704, entitled "Method For Automatic Generation Of Document History Log Exception Reports In A Data Processing System";

U.S. Pat. application Ser. No. 07/484,606, entitled "Method For Maintaining A Time Frame Selective Document History Log In A Data Processing System"; and U.S. Pat. application Ser. No. 07/484,705, entitled "Method For Maintaining An Alterable Document History Log In A Data Processing System", now U.S. Pat. No. 5,062,045 issued 10/29/91.

The contents of each of the above-referenced applications are hereby incorporated herein by reference thereto.

BACKGROUND OF THE INVENTION

1. Technical Field

The present invention relates in general to data processing systems and in particular to an improved method of maintaining multiple resource objects within a data processing system. Still more particularly, the present invention relates to a method for memory management within a document history log wherein a user may specify the manner in which memory space within the document history log shall be allocated.

2. Description of the Related Art

In large modern data processing systems it is possible to create, store, and access literally thousands of documents or resource objects Such activities may take place with regard to many users within a data processing system and it is often necessary to keep track of selected resource objects within the system to assure system integrity and maintain a record with regard to selected resource objects or documents within the system.

Document history logs are well known in the prior art. Many operating systems, database management subsystems and network subsystems marketed by International Business Machines of Armonk, New York incorporate logging facilities. For example, the Multiple Virtual Storage (MVS) operating system provides a logging system to the console operator so that all commands by the operator as well as the responses of the system are logged Additionally, other events within the system may be written to the operator log. The logging filter in this system is set system wide for all resources within the system by the system programmer. As with all such logging systems this system may be utilized to provide a record for problem reconciliation and to provide an audit trait for security purposes.

Figure 2:
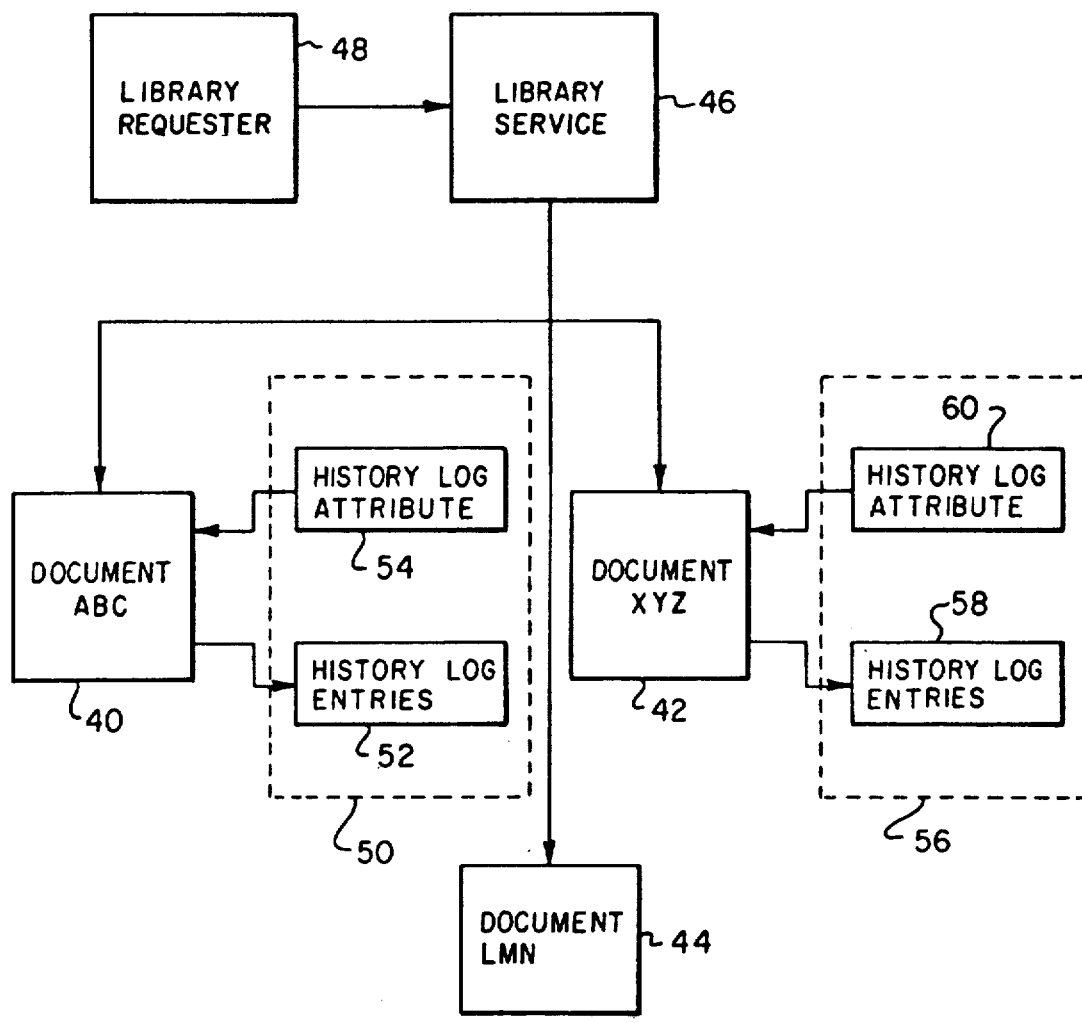
Figure 3:
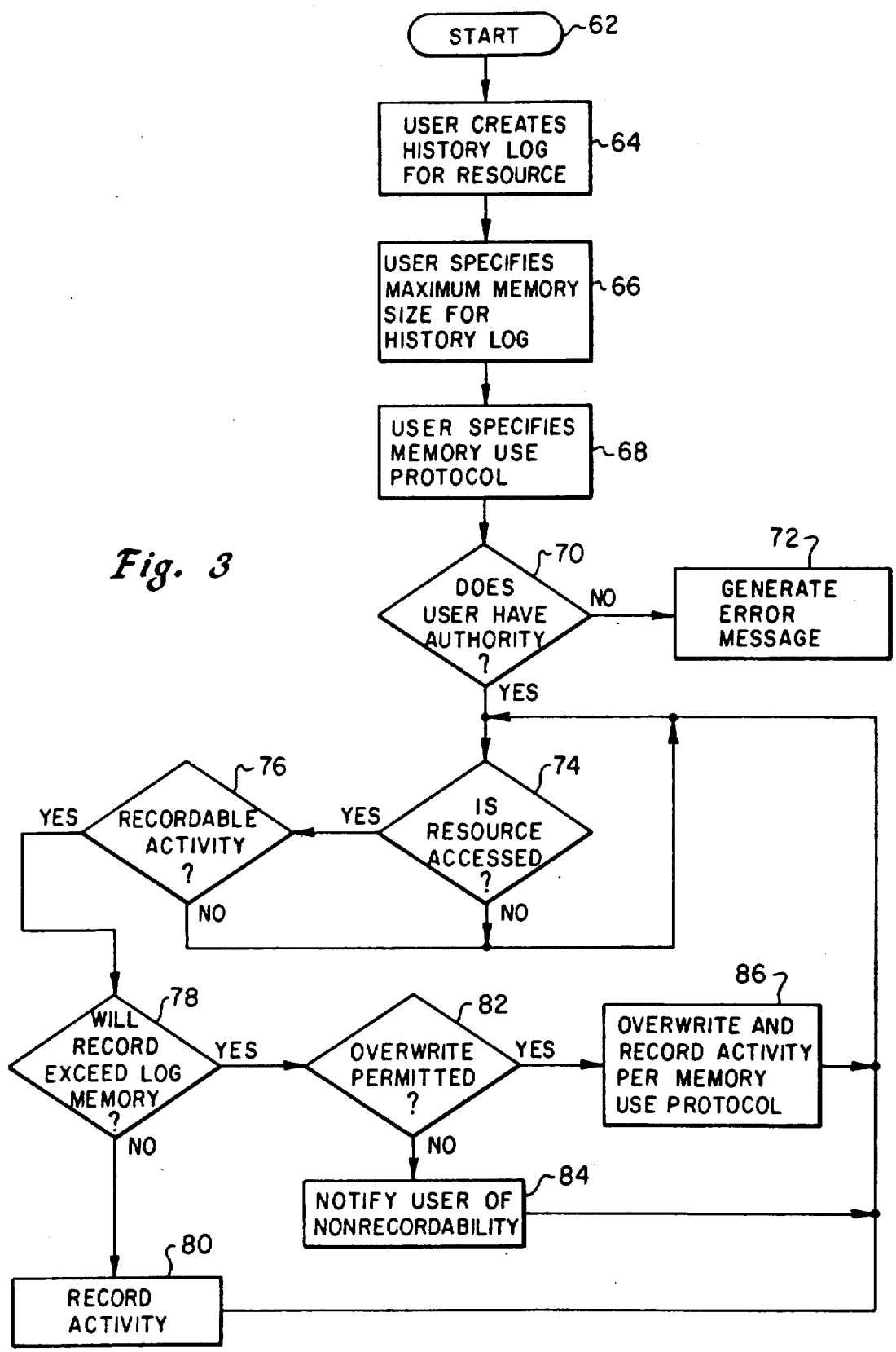

Database management systems, such as Customer Information Control System (CICS) and Information Management System (IMS) also utilize a history log. Such history logs are typically utilized to audit events and changes within the database. These logs are then util- FIG. 1 depicts a pictorial representation of a distributed data processing system which may be utilized to implement the method of the present invention;

FIG. 2 depicts in block diagram form a document history log system established in accordance with the method of the present invention; and FIG. 3 is a high level flow chart depicting the method of memory management within a document history log in accordance with the method of the present invention.

DETAILED DESCRIPTION OF THE PREFERRED EMBODIMENT

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8 In a manner well known in the prior art, each such document or resource object stored within a storage device 14 is associated with a Resource Manager or Library Service, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by main frame computer 18, as Resource Manager of Library Service for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type it is common for a user in one area of distributed data processing system 8 to access and/or modify a document or resource object within another portion of distributed data processing system 8. It should therefore be apparent that it would be very helpful to have a system whereby the activities of any or all of the users within distributed data processing system 8 with respect to a particular document or resource object may be recorded. However, with known document history log approaches the vast number of users within a distributed data processing system, such as the system illustrated, would clearly overwhelm a system which has a finite amount of memory available to record activities which relate to a particular resource object.

Referring now to FIG. 2, there is depicted a block diagram representation of a selective document history log implemented in accordance with the method of the present invention. As can be seen, three documents are represented. Document ABC 40, document XYZ 42 and document LMN 44 are all illustrated as being under the control of library service 46. As discussed above, library service 46 may be implemented utilizing any entity within distributed data processing system 8 (see FIG. 1) which is capable of acting as a resource manager for the documents thus illustrated. Additionally, a library requester 48 is illustrated. Library requester 48 shall correspond to any user within distributed data processing system 8 who desires to access a document or resource object controlled by library service 46.

As is illustrated, each and every document controlled by library service 46 does not require a document history log, in accordance with the method of the present invention. As is illustrated, document ABC 40 and document XYZ 42 both have associated therewith a document history log. That is, document history log 50 is associated with document ABC 40 and document history log 56 is associated with document XYZ 42. Document LMN 44 does not require a history log and no such log is illustrated.

In accordance with an important aspect of the present invention, it should be noted that each document history log thus illustrated includes two separate portions thereof. Specifically, document history log 50 includes a section labeled history log entries 52 and a section labeled history log attribute 54. Similarly, document history log 56 includes a section labeled history log entries 58 and history log attribute 60.

As those skilled in the art will appreciate, each history log entry section shall merely comprise a memory location wherein the occurrence of activities which take place with regard to an associated document may be recorded. In contrast, history log attributes 54 and 60 are utilized, in accordance with the method of the present invention, to specify the order in which the history log memory shall be allocated after the maximum size of the memory has been exceeded. In this manner, each document history log will have associated with it a memory section, such as history log entries 52 and 58. In view of the finite size of these memories the number of activities which take place with regard to a particular resource object may exceed the capability of the memory of a particular document history log. Thus, it should be apparent that additional activities which take place thereafter will either not be recorded or may be recorded in a manner which is not consistent with the requirements of the individual controlling the particular resource object.

By specifying, within history log attributes 54 and 60, the manner in which additional activities shall be recorded after the maximum memory size of each document history log has been exceeded it is possible to ensure that those activities shall be consistently recorded in accordance with a protocol specified by a user.

For example, by utilizing the method of the present invention, it will be possible to provide a memory management method for a document history log which may specify that if the recordation of an activity within a document history log will exceed the maximum memory specified for that history log, the recordation shall take place by overwriting the least recent entry within the history log. Alternately, the most recent entries within the history log may also be specified to be overwritten. By providing history log attributes 54 and 60 and permitting a user to specify the manner in which memory size shall be allocated, it will be possible for the user to retain either the earliest document history log entries or the most recent document history log entries, as desired.

Additionally, in a manner which will be explained in greater detail with respect to FIG. 3, in the event a user has not specified the manner in which history log entries shall be recorded in the event the maximum memory size of a document history log has been exceeded, an error message may be generated notifying a specified individual or service the user of the nonrecordability of future activities with regard to a particular resource object.

With reference now to FIG. 3, there is depicted high level flow chart which illustrates the memory management method within a document history log in accordance with the method of the present invention. As is illustrated, the process begins at block 62 and thereafter passes to block 64 which illustrates the creation by a user of a history log associated with a particular resource object. Next, block 66 depicts the specification by a user of a maximum memory size for utilization with the document history log thus created. In this manner those ordinarily skilled in the art will appreciate that a resource object having a high likelihood of activities may have a larger maximum memory size specified for the document history log associated therewith. Similarly, a resource object which is not accessible by a large number of users may utilize a document history log having a smaller memory size, thereby utilizing system memory assets more efficiently.

Thereafter, in accordance with an important aspect of the present invention, a user specifies a memory use protocol, as illustrated in block 68. By "memory use protocol" what is meant is whether or not the memory associated with a particular document history log may be overwritten in the event the maximum memory size has been exceeded. Additionally, such protocol may also specify whether the overwriting shall result in a new activity being recorded over the activity within the document history log which was recorded least recently or most recently, as desired by the user. Thereafter, block 70 illustrates a determination of whether or not the user has sufficient authority to specify such a memory use protocol. If the user does not have sufficient authority, block 72 depicts the generation of an error message utilizing any technique known in the art.

In the event the user in question does have sufficient authority to specify a particular memory use protocol for a history log, then block 74 illustrates a continuing determination of whether or not the resource object associated with the history log in question has been accessed. After determining that the resource object has not been accessed, the system proceeds iteratively, continuing to determine whether or not the resource object has been accessed. In the event the resource object associated with the history log created above then block 76 illustrates a determination of whether or not an activity has taken place with regard to that resource object which is a recordable activity. Of course, those skilled in the art will appreciate upon reference to the cross-referenced applications discussed above that the user may also specify that only selected activities from a plurality of such activities shall be recorded.

In the event the activity which has occurred is not a recordable activity, the process again returns to block 74 and proceeds in an iterative fashion. However, in the event the activity which has taken place is a recordable activity, as determined by block 76, then block 78 illustrates a determination of whether or not a record of this activity will exceed the maximum memory size specified for this history log. If not, block 80 depicts the recording of the activity and the process again returns to block 74 to proceed in an iterative fashion as discussed above.

In the event the recordation of the current activity will exceed the maximum memory size specified for the history log in question, as determined at block 78, then block 82 illustrates a determination of whether or not an overwrite of the document history log memory is permitted, in accordance with the memory use protocol specified above in block 68. If not, block 84 illustrates a notification of a specified user or service of the nonrecordability of this activity, in any manner well known in the art.

Finally, if the determination illustrated in block 82 indicates that an overwrite is permitted, then block 86 illustrates the overwriting of previously stored activities within the document history log, by the recording of the present activity into the memory associated therewith in accordance with the user protocol specified above in block 68. Of course, as discussed above, those skilled in the art will appreciate that there are multiple methods whereby such an overwrite may occur. For example, the present activity may be recorded into the memory associated with the document history log over the least recent activity recorded therein, or, alternatively, over the most recent activity recorded therein, as specified by the user.

Upon reference to the foregoing those skilled in the art will appreciate that the Applicants in the present invention have developed a method whereby memory management within a document history log may be utilized to ensure that a user may efficiently utilize system memory assets by specifying the size of memory associated with each document history log and thereafter control the manner in which activities are recorded within that memory by permitting the overwriting of new activities in the event the maximum memory size has been exceeded. In this manner, the control and maintenance of documents or resource objects within a distributed data processing system may be efficiently carried out by the efficient utilization of memory space for document history logs.

While the invention has been particularly shown and described with reference to a preferred embodiment, it will be understood by those skilled in the art that various changes in form and detail may be made therein without departing from the spirit and scope of the invention.

We claim:

1. A method in a data processing system of efficiently maintaining a record of activities relating to a selected resource object accessible by a plurality of users within said data processing system, said method comprising the steps of:
    creating a history log associated with a selected resource object;
    specifying a maximum memory size for said history log;
    specifying the order in which said history log memory shall be allocated after said maximum memory size has been exceeded; and
    recording within said history log, in said specified order, those activities relating to said selected resource object.

2. The method in a data processing system of efficiently maintaining a record of activities relating to a selected resource object accessible by a plurality of users within said data processing system according to claim 1, wherein said specified order in which said history log memory shall be allocated after said maximum memory size has been exceeded comprises overwriting those activities recorded least recently within said memory log.

3. The method in a data processing system of efficiently maintaining a record of activities relating to a selected resource object accessible by a plurality of users within said data processing system according to claim 1, wherein said specified order in which said history log memory shall be allocated after said maximum memory size has been exceeded comprises overwriting those activities recorded most recently within said memory log prior to the exceeding of said maximum memory size.

4. The method in a data processing system of efficiently maintaining a record of activities relating to a selected resource object accessible by a plurality of users within said data processing system according to claim 1, further including the step of determining whether a user has authority to specify the order in which said history log memory shall be allocated after said maximum memory size has been exceeded.

5. The method in a data processing system of efficiently maintaining a record of activities relating to a selected resource object accessible by a plurality of users within said data processing system according to claim 4, further including the step of generating an error report in the event said user does not have authority to specify the order in which said history log memory shall be allocated after said maximum memory size has been exceeded.

6. The method in a data processing system of efficiently maintaining a record of activities relating to a selected resource object accessible by a plurality of users within said data processing system according to claim 1, further including the step of determining whether the recording of an activity will exceed said maximum memory size prior to recording said activity.

7. A data processing system for efficiently maintaining a record of activities relating to a selected resource object accessible by a plurality of users within said data processing system, said data processing system comprising:
    means for creating a history log associated with a selected resource object;
    means for specifying a maximum memory size for said history log;
    means for specifying the order in which said history log memory shall be allocated after said maximum memory size has been exceeded; and
    means for recording within said history log, in said specified order, those activities relating to said selected resource object.

8. The data processing system for efficiently maintaining a record of activities relating to a selected resource object accessible by a plurality of users within said data processing system according to claim 7 further including means for determining whether a user has authority to specify the order in which said history log memory shall be allocated after said maximum memory size has been exceeded.

9. The data processing system for efficiently maintaining a record of activities relating to a selected resource object accessible by a plurality of users within said data processing system according to claim 8 further including means for generating an error report in the event said user does not have authority to specify the order in which said history log memory shall be allocated after said maximum memory size has been exceeded.

10. The data processing system for efficiently maintaining a record of activities relating to a selected resource object accessible by a plurality of users within said data processing system according to claim 7 further including means for determining whether the recording of an activity will exceed said maximum memory size prior to recording said activity.

* * * * *